United States Patent
Makus

(10) Patent No.: US 7,066,502 B1
(45) Date of Patent: Jun. 27, 2006

(54) GATE LATCHING MECHANISM

(76) Inventor: Gilbert M Makus, 4906 E. Brown North, Apt. #16, Mesa, AZ (US) 85205

( * ) Notice: Subject to any disclaimer, the term of this patent is extended or adjusted under 35 U.S.C. 154(b) by 110 days.

(21) Appl. No.: 10/826,331

(22) Filed: Apr. 19, 2004

(51) Int. Cl.
*E05C 1/06* (2006.01)
(52) U.S. Cl. ...................... 292/139; 292/166
(58) Field of Classification Search ............. 292/166, 292/167, 168, 139
See application file for complete search history.

(56) References Cited

U.S. PATENT DOCUMENTS

| | | | |
|---|---|---|---|
| 336,374 A * | 2/1886 | Bayrhoffer | 292/168 |
| 440,919 A * | 11/1890 | Hendricks | 292/167 |
| 442,646 A | 12/1890 | Songer | |
| 727,139 A | 5/1903 | Heston | |
| 846,804 A | 3/1907 | Patton | |
| 1,663,867 A * | 3/1928 | Swenka | 292/167 |
| 1,701,429 A | 2/1929 | Thompson | |
| 2,707,478 A | 5/1955 | Wolf et al. | |
| 2,759,752 A * | 8/1956 | Demings | 292/337 |
| 3,476,427 A * | 11/1969 | Kittelson | 292/175 |
| D283,199 S | 4/1986 | Ostergren | |

* cited by examiner

*Primary Examiner*—Gary Estremsky

(57) ABSTRACT

A gate latching mechanism includes a frame with a handle pivotally attached thereto. A locking member is connected to the handle and moves with it during operating conditions. The frame further includes brackets connected to the fence posts and the frame respectively that guide and receive the locking member. The present invention further includes a spring mechanism within the locking member, which includes a spring connected to a pin. Such a spring is stretched when the locking member is open and reaches equilibrium when the locking member is closed. The present invention further includes a specialized bracket for connecting the handle to the frame so that it may be selectively pivoted as desired by a user.

11 Claims, 4 Drawing Sheets

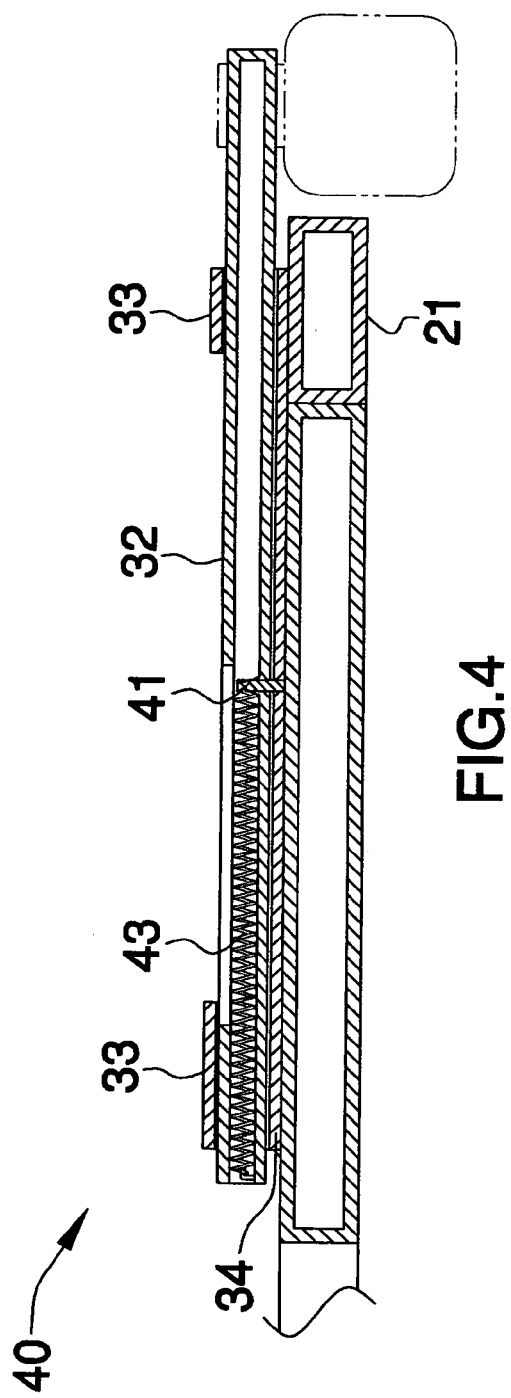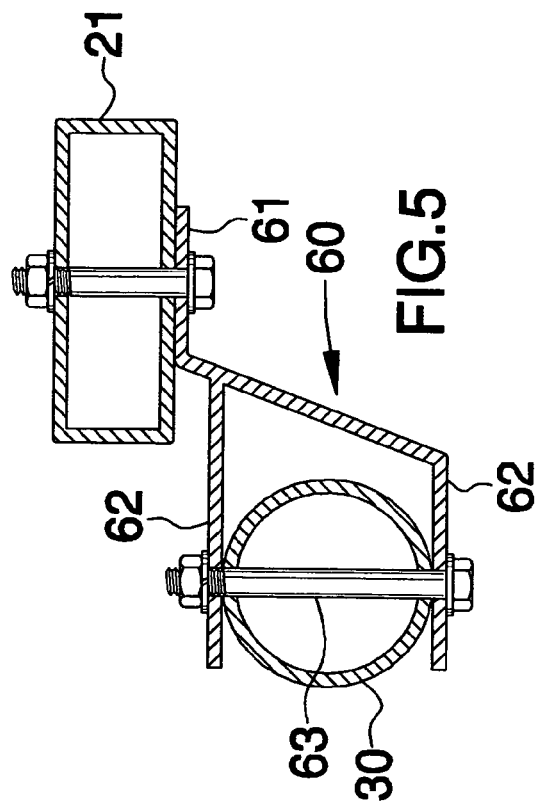

GATE LATCHING MECHANISM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a gate latch and, more particularly, to a gate latch with an extended handle for use on large fences.

2. Prior Art

Large gates, such as those found in fences on cattle ranches and farms, often don not include a dependable locking mechanism to secure the gate in a closed position. These gates require the use of an outside locking apparatus and many people resort to a simple chain and padlock for securing the gate. This type of locking apparatus may quickly rust and wear out, causing the owner to have to continually buy a new chain and lock.

A hard day's work may require the use of a horse or piece of small farm equipment such as a tractor or ATV. Returning home from such a day, one is delayed when one is forced to dismount and approach the gate on foot. Once there, the process of unlocking the gate, passing through it with the horse or equipment, locking the gate once again, and remounting the horse or equipment is time consuming.

Accordingly, a need remains for a durable gate latching mechanism that provides security and overcomes the above-noted shortcomings.

BRIEF SUMMARY OF THE INVENTION

In view of the foregoing background, it is therefore an object of the present invention to provide a gate latch for use on large fences. These and other objects, features, and advantages of the invention are provided by a gate latching mechanism including a frame having a plurality of spaced vertical members pivotally secured to a first fence post and removably engageable with a second fence post respectively. Such a frame extends between the first and second fence posts for preventing entrance from an exterior thereof.

Advantageously, the present invention further includes a handle pivotally connected to one of the plurality of vertical members that is movable along a first plane between neutral and pivoted positions. Such a handle includes a bolt traversing therethrough that is disposed substantially orthogonal to the first plane.

The present invention further includes an elongated locking member operably connected to the handle bolt and is disposed along a horizontal plane between the plurality of fence posts and also extends substantially perpendicular to the handle bolt. Such a locking member contemporaneously moves with the handle bolt in select directions during operating conditions.

The present invention further includes a plurality of brackets connected to one of the fence posts and the frame respectively. Such a plurality of brackets advantageously guide and receive the locking member therethrough so that the frame can be selectively toggled between locked and unlocked positions.

The latching mechanism further includes a back up plate welded to the plurality of brackets for assisting to maintain the locking member at a substantially stable position during operating conditions.

Advantageously, the present invention further includes a spring mechanism disposed within the locking member for maintaining the locking member at a predetermined position so that the frame can remain locked when a user releasing the handle. The spring mechanism includes a pin connected to the back up plate and extends outwardly therefrom towards the locking member. The locking member has a substantially horizontal slot formed therein for receiving the pin therethrough so that the locking member can be directed along a substantially horizontal path when moved between open and closed positions.

The spring mechanism further includes a helical spring member connected to the pin and extending rearwardly therefrom within the locking member. Such a spring member is stretched when the locking member is moved to an open position and reaches an equilibrium state when the locking member is moved to a closed position.

The present invention further includes a rod coupling welded to the locking member that has a threaded interior surface for receiving the handle bolt therein. The rod coupling further includes a stop member threadably connected to it for defining a maximum distance through which the handle bolt can be inserted into the rod coupling. Advantageously, the present invention further includes at least one bushing positioned about the rod coupling for assisting to maintain same at a stable position during operating conditions.

The present invention further includes an off-center bracket for pivotally connecting the handle to the frame. Such an off-center bracket includes a flange portion secured to the frame and a plurality of spaced side walls integral with the flange portion for receiving the handle therebetween. The plurality of side walls have a plurality of apertures formed therein that are respectively aligned along a select plane for receiving a fastening member therethrough so that the handle may be selectively pivoted as desired by a user.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is an enlarged cross-sectional view of FIG. 1 showing the spring mechanism disposed within the locking member, taken along line 4—4; and FIG. 5 is an enlarged cross-sectional view of FIG. 1 showing the off-center bracket, taken along line 5—5.

DETAILED DESCRIPTION OF THE INVENTION

Figure 1:
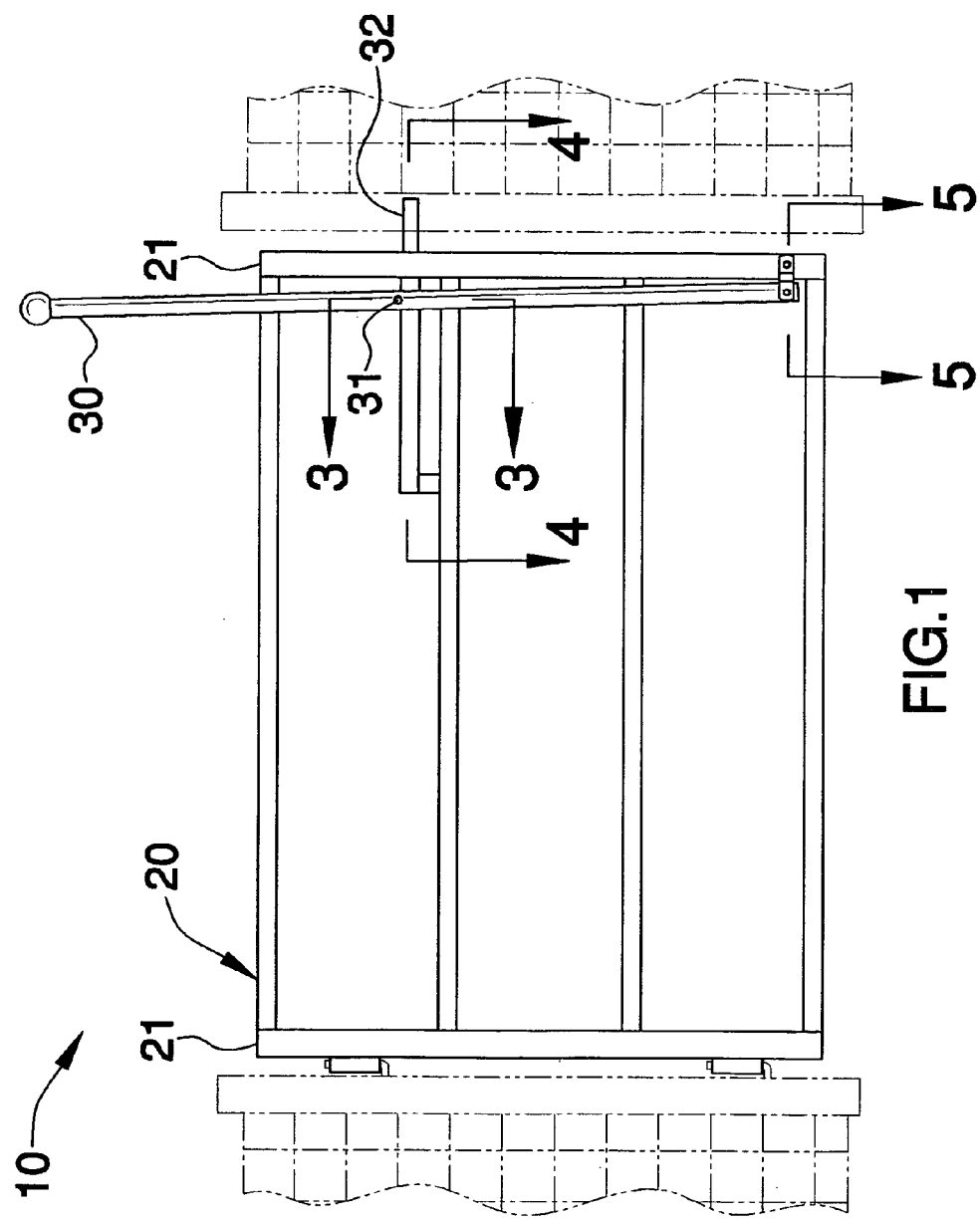
FIG. 1 is a front elevational view showing a gate latch mechanism, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The mechanism of this invention is referred to generally in FIGS. 1–5 by the reference numeral 10 and is intended to provide a gate latch mechanism with an extended handle for use on large fences. It should be understood that the mechanism 10 may be used on various-sized fences.

Referring initially to FIG. 1, the mechanism 10 includes a frame 20 having a plurality of spaced vertical members 21 pivotally secured to a first fence post and removably engageable with a second fence post respectively. Such a frame 20 extends between the first and second fence posts for preventing entrance from an exterior thereof.

Advantageously, the present invention further includes a handle 30 pivotally connected to one of the plurality of vertical members 21 that is movable along a first plane between neutral and pivoted positions. Such a handle 30 includes a bolt 31 traversing therethrough that is disposed substantially orthogonal to the first plane.

Figure 2:
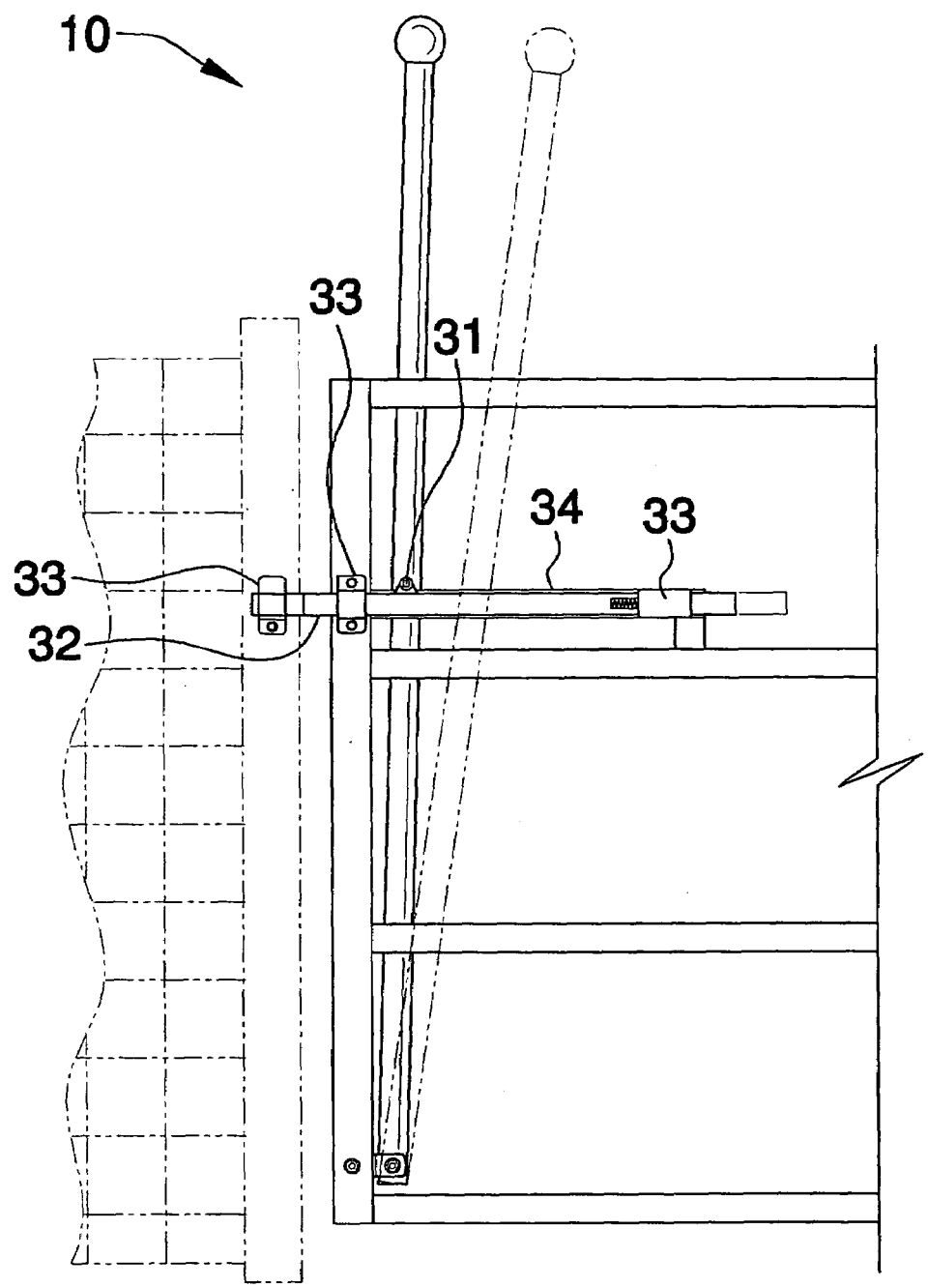
FIG. 2 is a partially enlarged rear elevational view of FIG. 1 showing the movable handle between open and closed positions.

Referring to FIG. 2, the present invention further includes an elongated locking member 32 operably connected to the handle bolt 31 and is disposed along a horizontal plane between the plurality of fence posts and also extends substantially perpendicular to the handle bolt 31. Such a locking member 32 contemporaneously moves with the handle bolt 31 in select directions during operating conditions.

The present invention further includes a plurality of brackets 33 connected to one of the fence posts and the frame 20 respectively. Such a plurality of brackets 33 advantageously guide and receive the locking member 32 therethrough so that the frame 20 can be selectively toggled between locked and unlocked positions.

The latching mechanism 10 further includes a back up plate 34 welded to the plurality of brackets 33 for assisting to maintain the locking member 32 at a substantially stable position during operating conditions.

Referring to FIG. 4, the present invention advantageously includes a spring mechanism 40 disposed within the locking member 32 for maintaining the locking member 32 at a predetermined position so that the frame 20 can remain locked when a user releasing the handle 30. The spring mechanism 40 includes a pin 41 connected to the back up plate 34 and extends outwardly therefrom towards the locking member 32. The locking member 32 has a substantially horizontal slot 42 formed therein for receiving the pin 41 therethrough so that the locking member 32 can be directed along a substantially horizontal path when moved between open and closed positions. The spring mechanism 40 further includes a helical spring member 43 connected to the pin 41 and extending rearwardly therefrom within the locking member 32. Such a spring member 43 is stretched when the locking member 32 is moved to an open position and reaches an equilibrium state when the locking member 32 is moved to a closed position.

Figure 3:
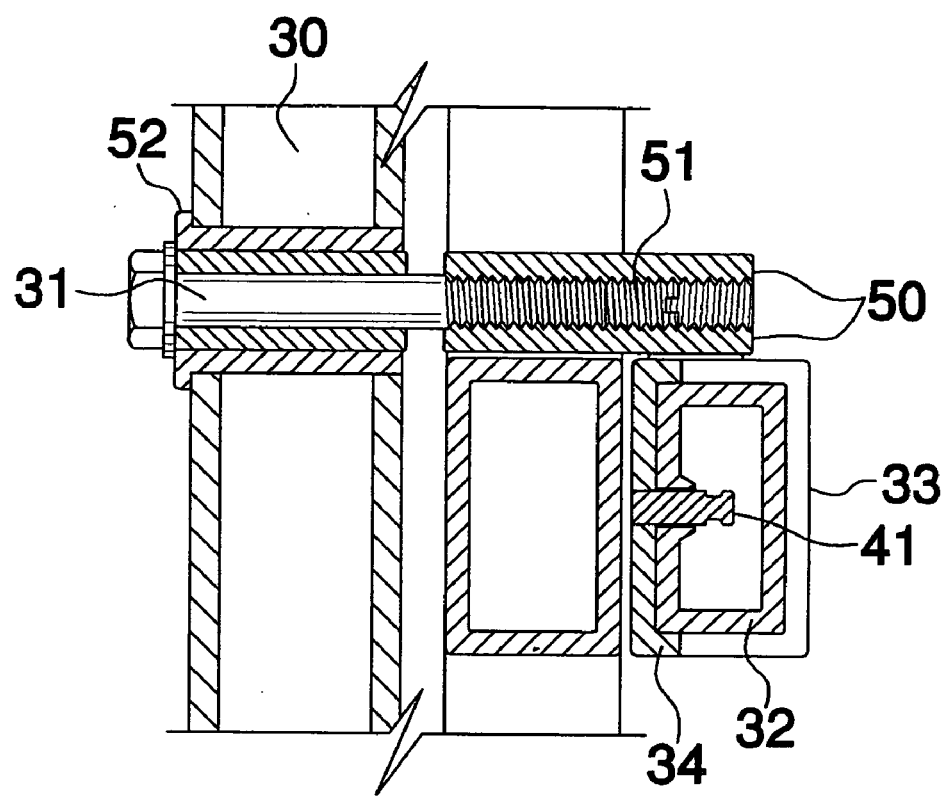
FIG. 3 is an enlarged cross-sectional view of FIG. 1 showing the handle bolt and locking member, taken along line 3—3.

Now referring to FIG. 3, the present invention further includes a rod coupling 50 welded to the locking member 32 that has a threaded interior surface for receiving the handle bolt 31 therein. The rod coupling 50 further includes a stop member 51 threadably connected to it for defining a maximum distance through which the handle bolt 31 can be inserted into the rod coupling 50. Advantageously, the present invention further includes at least one bushing 52 positioned about the rod coupling 50 for assisting to maintain same at a stable position during operating conditions.

Now referring to FIG. 5, the present invention further includes an off-center bracket 60 for pivotally connecting the handle 30 to the frame 20. Such an off-center bracket 60 includes a flange portion 61 secured to the frame 20 and a plurality of spaced side walls 62 integral with the flange portion 61 for receiving the handle 30 therebetween. The plurality of side walls 62 have a plurality of apertures formed therein that are respectively aligned along a select plane for receiving a fastening member 63 therethrough so that the handle 30 may be selectively pivoted as desired by a user.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A gate latching mechanism comprising:
    a frame comprising a plurality of spaced vertical members pivotally secured to a first fence post and removably engageable with a second fence post respectively, said frame extending between the first and second fence posts for preventing entrance from an exterior thereof;
    a handle pivotally mounted with respect to one of the vertical members and being movable along a first plane between neutral and pivoted positions, said handle comprising a bolt traversing therethrough and being disposed substantially orthogonal to the first plane;
    an elongated locking member operably connected to said handle bolt and being disposed along a horizontal plane between the plurality of fence posts and extending substantially perpendicular to said handle bolt, said locking member contemporaneously moving with said handle bolt in select directions during operating conditions;
    a plurality of brackets connected to one of the fence posts and said frame respectively, said plurality of brackets for guiding and receiving said locking member therethrough so that said frame can be selectively toggled between locked and unlocked positions;
    a back up plate welded to said plurality of brackets and for assisting to maintain said locking member at a substantially stable position during operating conditions; and spring means disposed within said locking member and for maintaining said locking member at a predetermined position so that said frame can remain locked as desired by a user, said spring means comprising a pin connected to said back up plate and extending outwardly therefrom towards said locking member, said locking member having a substantially horizontal slot formed therein and for receiving said pin therethrough so that said locking member can be directed along a substantially horizontal path when moved between open and closed positions, and a helical spring member connected to said pin and extending rearwardly therefrom within said locking member, said spring member being stretched when said locking member is moved to an open position and reaching an equilibrium state when said locking member is moved to a closed position.

2. The gate latching mechanism of claim 1, further comprising;

a rod coupling welded to said locking member and having a threaded interior surface for receiving said handle bolt therein; and a stop member threadably connected to said rod coupling and for defining a maximum distance through which said handle bolt can be inserted into said rod coupling.

3. The gate latching mechanism of claim 1, further comprising: an off-center bracket for pivotally connecting said handle to said frame, said off-center bracket comprising a flange portion secured to said frame, and a plurality of spaced side walls integral with said flange portion and for receiving said handle therebetween, said plurality of side walls having a plurality of apertures formed therein and being respectively aligned along a select plane and for receiving a fastening member therethrough so that said handle can be selectively pivoted as desired by a user.

4. The gate latching mechanism of claim 2, further comprising: at least one bushing positioned about said rod coupling and for assisting to maintain same at a stable position during operating conditions.

5. A gate latching mechanism comprising:

a frame comprising a plurality of spaced vertical members pivotally secured to a first fence post and removably engageable with a second fence post respectively, said frame extending between the first and second fence posts for preventing entrance from an exterior thereof;

a handle pivotally mounted with respect to one of the vertical members and being movable along a first plane between neutral and pivoted positions, said handle comprising a bolt traversing therethrough and being disposed substantially orthogonal to the first plane;

an elongated locking member operably connected to said handle bolt and being disposed along a horizontal plane between the plurality of fence posts and extending substantially perpendicular to said handle bolt, said locking member contemporaneously moving with said handle bolt in select directions during operating conditions;

a plurality of brackets connected to one of the fence posts and said frame respectively, said plurality of brackets for guiding and receiving said locking member therethrough so that said frame can be selectively toggled between locked and unlocked positions;

a back up plate welded to said plurality of brackets and for assisting to maintain said locking member at a substantially stable position during operating conditions; and spring means disposed within said locking member and for maintaining said locking member at a predetermined position so that said frame can remain locked as desired by a user; said spring means comprising a pin connected to said back up plate and extending outwardly therefrom towards said locking member, said locking member having a substantially horizontal slot formed therein and for receiving said pin therethrough so that said locking member can be directed along a substantially horizontal path when moved between open and closed positions, and a helical spring member connected to said pin and extending rearwardly therefrom within said locking member, said spring member being stretched when said locking member is moved to an open position and reaching an equilibrium state when said locking member is moved to a closed position.

6. The gate latching mechanism of claim 5, further comprising:

a rod coupling welded to said locking member and having a threaded interior surface for receiving said handle bolt therein; and a stop member threadably connected to said rod coupling and for defining a maximum distance through which said handle bolt can be inserted into said rod coupling.

7. The gate latching mechanism of claim 5, further comprising: an off-center bracket for pivotally connecting said handle to said frame, said off-center bracket comprising a flange portion secured to said frame, and a plurality of spaced side walls integral with said flange portion and for receiving said handle therebetween, said plurality of side walls having a plurality of apertures formed therein and being respectively aligned along a select plane and for receiving a fastening member therethrough so that said handle can be selectively pivoted as desired by a user.

8. The gate latching mechanism of claim 6, further comprising: at least one bushing positioned about said rod coupling and for assisting to maintain same at a stable position during operating conditions.

9. A gate latching mechanism comprising:

a frame comprising a plurality of spaced vertical members pivotally secured to a first fence post and removably engageable with a second fence post respectively, said frame extending between the first and second fence posts for preventing entrance from an exterior thereof;

a handle pivotally mounted with respect to one of the vertical members and being movable along a first plane between neutral and pivoted positions, said handle comprising a bolt traversing therethrough and being disposed substantially orthogonal to the first plane;

an elongated locking member operably connected to said handle bolt and being disposed along a horizontal plane between the plurality of fence posts and extending substantially perpendicular to said handle bolt, said locking member contemporaneously moving with said handle bolt in select directions during operating conditions;

a plurality of brackets connected to one of the fence posts and said frame respectively, said plurality of brackets for guiding and receiving said locking member therethrough so that said frame can be selectively toggled between locked and unlocked positions;

a back up plate welded to said plurality of brackets and for assisting to maintain said locking member at a substantially stable position during operating conditions;

spring means disposed within said locking member and for maintaining said locking member at a predetermined position so that said frame can remain locked as desired by a user; said spring means comprising a pin connected to said back up plate and extending outwardly therefrom towards said locking member, said locking member having a substantially horizontal slot formed therein and for receiving said pin therethrough so that said locking member can be directed along a substantially horizontal path when moved between open and closed positions, and a helical spring member connected to said pin and extending rearwardly therefrom within said locking member, said spring member being stretched when said locking member is moved to an open position and reaching an equilibrium state when said locking member is moved to a closed position;

a rod coupling welded to said locking member and having a threaded interior surface for receiving said handle bolt therein; and a stop member threadably connected to said rod coupling and for defining a maximum distance through which said handle bolt can be inserted into said rod coupling.

10. The gate latching mechanism of claim 9, further comprising: an off-center bracket for pivotally connecting said handle to said frame, said off-center bracket comprising a flange portion secured to said frame, and a plurality of spaced side walls integral with said flange portion and for receiving said handle therebetween, said plurality of side walls having a plurality of apertures formed therein and being respectively aligned along a select plane and for receiving a fastening member therethrough so that said handle can be selectively pivoted as desired by a user.

11. The gate latching mechanism of claim 9, further comprising: at least one bushing positioned about said rod coupling and for assisting to maintain same at a stable position during operating conditions.

\* \* \* \* \*